July 14, 1942.   R. E. ROUSSEAU   2,289,552
WINDSHIELD WIPER ARM
Filed May 27, 1940
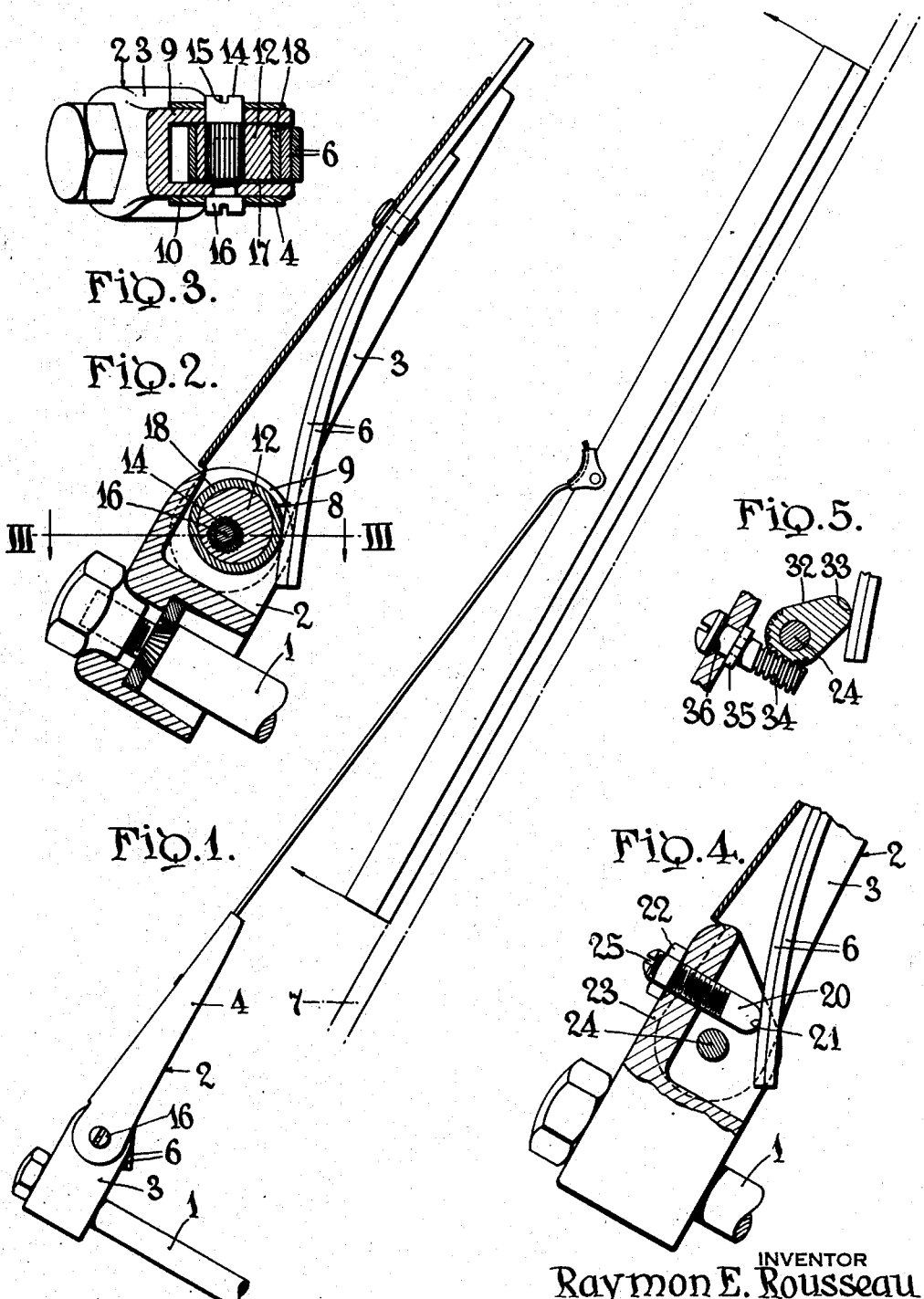
INVENTOR
Raymon E. Rousseau,
BY
Beau, Brooks, Buckley & Beau.
ATTORNEYS Patented July 14, 1942

2,289,552

UNITED STATES PATENT OFFICE 2,289,552

WINDSHIELD WIPER ARM

Raymon E. Rousseau, Buffalo, N. Y., assignor to Trico Products Corporation, Buffalo, N. Y.

Application May 27, 1940, Serial No. 337,348

7 Claims. (Cl. 15—255)

This invention relates to windshield cleaners having spring means for resiliently urging the wiper arm towards the windshield and more particularly to means for regulating the pressure of the spring means to obtain the proper wiping pressure of the wiper upon the windshield.

In this type of cleaner now in common use on present day motor vehicles the wiping pressure varies in accordance with the angular position of the arm with respect to the windshield, and since the method of assembling motor vehicle bodies in mass production permits some misalignment between the body parts, the relation between the cleaner and the windshield is not always the same and the pressure of the wiper on the windshield may be either too great or too small for proper operation.

The present invention has for its object to provide a simple wiper arm construction having means arranged to be readily adjustable to compensate for misalignment of the body parts so that the wiper may operate under a predetermined resilient pressure in the wiping contact whereby the maximum cleaning efficiency may be obtained.

In the accompanying drawing:

Fig. 1 is a side elevational view of a windshield cleaner construction in accordance with the present invention;

Fig. 2 is a fragmentary sectional view taken longitudinally on Fig. 1 and on a larger scale;

Fig. 3 is a sectional view taken on line III—III of Fig. 2;

Fig. 4 is a fragmentary partial sectional view of a modified form of the invention; and Fig. 5 is a fragmentary sectional view of another form of the invention.

Referring more particularly to the drawing, the numeral 1 designates the shaft of a windshield cleaner having secured thereto in any suitable manner an arm generally indicated at 2. The arm comprises an inner section 3 and an outer section 4 pivotally secured thereto by a pivot hereinafter referred to. A spring 6 is arranged to resiliently urge the wiper about the axis of the pivot toward a windshield indicated in broken lines at 7.

According to the present invention the spring is carried by one section with its free end bearing on an adjustable support generally indicated at 8 and carried by the other section between the ears 9 and 10, with means for varying the position of the support to regulate the tension of the spring and consequently obtain the proper resilient wiping engagement of the wiper upon the windshield.

The variable support shown in Figs. 1, 2 and 3 includes a circular cam 12 eccentrically secured on a stud 14 as by the straight knurled interengagement therebetween. One end portion of the stud is journaled in an opening in ear 9 and is extended therebeyond so that the position of the cam may be varied by a tool, such as a screw driver, inserted in the kerf 15 formed therein. The other end portion of the stud may be provided with an internally threaded central opening into which the threaded shank of a headed cam locking screw 16 is threaded. An unthreaded portion of the screw shank is journaled in an opening formed in ear 10 and aligned with the opening in ear 9. The head of the screw bears upon the outer face of ear 10 and when it is screwed into the stud it draws the adjacent side face of the cam into locking engagement with the inner face of ear 10. The locking engagement of the cam with ear 10 may be increased if desired as by roughening or serrating the engaging face of the cam as indicated at 17. The cam may also be provided with a ring 18 journaled thereon to reduce any binding tendency between the spring and the cam when one is moved with respect to the other.

The outer arm section may be conveniently pivoted on the inner arm section by the extended end portion of the stud 14 and the head of the screw 16, or it may be pivoted to the inner section in any suitable manner.

Adjustment of the tension of the spring may be simply made by loosening the locking screw 16, then partially rotating the cam 12 by stud 14 until the proper spring tension is obtained and then tightening the screw until the cam is locked in its adjusted position.

In Fig. 4 a simplified form of the cam adjustment for the spring support is shown and comprises a screw 20 having threaded engagement with a relatively thick front wall 23 of the inner arm section 3, the rounded inner end 21 of the screw being directed toward and bearing up the spring 6 on the outer section, which latter is connected by a pivot 24 to the inner section 3. The threaded portion of screw 20 extends beyond the front wall of the inner section and is provided with a lock nut 22 which serves to secure the screw in its adjusted position. A kerf 25 is formed in the outer end portion of the screw so that the screw may be readily adjusted when the lock nut is loosened.

A further modified form of the variable support for the spring is depicted in Fig. 5 and embodies a cam 32 pivotally mounted for rotative movement between the side walls of the inner arm section on the pivot pin 24 and having its rounded outer camming nose 33 movable in the path of the spring and bearing thereagainst. A screw member 34 is rotatably secured to the front wall of the inner section by a split collar 35 engaging a groove in the screw and its inner end has threaded engagement with the cam in a manner similar to the engagement of a worm with a wheel so that while the screw may be rotated to vary the position and pressure of the spring, the pressure of the spring cannot change the position of the screw. A friction washer 36 may be interposed between the head of the screw and the face of the wall so that a positive movement of the screw is required to change the adjustment of the spring pressure. It should be noted that in varying the tension of the spring, the effective length of the spring varies very slightly so that the action of the spring is not cramped especially when the tension is greatest.

In the illustrated forms of the invention the variable support for the spring is rotatably mounted between opposed ears 9 and 10 formed on the inner arm section which also carries means for securing the variable support in any of its adjusted positions.

It should be understood that the foregoing description has been given to exemplify the teaching of the present invention. However, the inventive principles involved are capable of other physical embodiments without departing from the spirit and scope of the invention herein claimed.

What is claimed is:

1. A wiper arm for windishield cleaners, comprising an outer channel section pivoted to an inner channel section for angular movement about the axis of the pivot, a spring having one end secured within the channel of one section with its opposite end extending into and guided by the side walls of the other section, supporting means for said opposite end of the spring carried by said other section and arranged for selectively obtaining a proper spring pressure when the angular relation of the inner and outer sections is changed, and means including a screw for securing the spring supporting means in a selected position.

2. In a wiper arm for windshield cleaners, a channeled inner section, a channeled outer section pivotally connected thereto, a leaf spring anchored at one end in the channel of one of said sections and having its opposite end extending over into the channel of the other section, spring pressure regulating means carried within the channel of the other section in supporting relation to said opposite end of the leaf spring, said means being in the form of a cam and operable to regulate the resilient urge of the spring, and means securing said regulating means in an adjusted position.

3. In a wiper arm for windshield cleaners, an inner section, an outer section pivotally connected thereto, a leaf spring carried at one end by the outer section, cam means carried by the inner section and constituting a support for the opposite end of the spring whereby the latter will urge the outer section toward a windshield, and means to rotate the cam means for selectively varying the urge of the spring.

4. In a wiper arm for windshield cleaners, an inner section, an outer section pivotally connected thereto, a leaf spring carried at one end by the outer section, cam means carried by the inner section and constituting a support for the opposite end of the spring whereby the latter will urge the outer section toward a windshield, means to rotate the cam means for selectively varying the urge of the spring, and means securing the cam in an adjusted position.

5. In a wiper arm for windshield cleaners, an inner section, an outer section pivotally connected thereto, a leaf spring carried at one end by one of said sections, a spring pressure regulating cam journaled for eccentric adjustment on the other section and supporting the opposite end of the spring on its periphery to regulate the resilient urge of the spring upon eccentric adjustment of the cam, and an anti-friction means between said spring and said regulating means.

6. In a wiper arm for windshield cleaners, a channel inner section, a channel outer section pivotally connected thereto, a leaf spring carried at one end in the channel of by one of said sections and extending over into the channel of the other section, and spring pressure regulating means carried by the other section and including a screw having one end within the channel of said other section and terminating short of the free edges of the side walls of the channel for supporting the extending free end of the leaf spring whereby said side walls may guide the free end of the spring against lateral displacement from the supporting end of the screw.

7. In a wiper arm for windshield cleaners, an inner section, an outer section pivotally connected thereto, a spring carried by one of said sections and operably connected to the other section for resiliently urging the outer section toward a windshield, and spring pressure regulating means carried by the other section and including a pivoted cam and a rotatable member having threaded engagement with the cam for directly changing the position of the latter to determine the resilient urge of the spring.

RAYMON E. ROUSSEAU.